United States Patent
Gupta et al.

(10) Patent No.: US 10,989,040 B2
(45) Date of Patent: Apr. 27, 2021

(54) METHOD OF USING CONTROLLED RELEASE TRACERS

(71) Applicant: Baker Hughes, LLC, Houston, TX (US)

(72) Inventors: D. V. Satyanarayana Gupta, The Woodlands, TX (US); Harold Dean Brannon, Magnolia, TX (US)

(73) Assignee: Baker Hughes, LLC, Houston, TX (US)

( * ) Notice: Subject to any disclaimer, the term of this patent is extended or adjusted under 35 U.S.C. 154(b) by 124 days.

(21) Appl. No.: 15/870,319

(22) Filed: Jan. 12, 2018

(65) Prior Publication Data

US 2018/0135403 A1    May 17, 2018

Related U.S. Application Data

(62) Division of application No. 13/678,431, filed on Nov. 15, 2012, now Pat. No. 9,874,080.

(60) Provisional application No. 61/562,887, filed on Nov. 22, 2011.

(51) Int. Cl.
| | |
|---|---|
| *E21B 47/00* | (2012.01) |
| *E21B 47/11* | (2012.01) |
| *C09K 8/03* | (2006.01) |
| *C09K 8/12* | (2006.01) |
| *C09K 8/62* | (2006.01) |

(52) U.S. Cl.
CPC .............. *E21B 47/00* (2013.01); *C09K 8/03* (2013.01); *C09K 8/62* (2013.01); *E21B 47/11* (2020.05); *C09K 2208/30* (2013.01)

(58) Field of Classification Search
None
See application file for complete search history.

(56) References Cited

U.S. PATENT DOCUMENTS

| | | | |
|---|---|---|---|
| 2006/0124302 A1* | 6/2006 | Gupta | C09K 8/516 166/279 |
| 2008/0210421 A1* | 9/2008 | Wilson | C09K 8/80 166/254.1 |
| 2010/0307745 A1* | 12/2010 | Lafitte | C09K 8/62 166/250.12 |
| 2012/0292025 A1* | 11/2012 | Stoll | E21B 43/16 166/269 |
| 2013/0341012 A1* | 12/2013 | Belani | E21B 43/166 166/250.12 |

* cited by examiner

*Primary Examiner* — Charles R Nold
(74) *Attorney, Agent, or Firm* — John Wilson Jones; Jones Delflache LLP

(57) ABSTRACT

Fluids produced from a fractured subterranean formation may be monitored by pumping into the well a fracturing fluid which contains a tracer. The method may be used to monitor produced hydrocarbons as well as produced water. The tracer may also be used in a sand control, frac pack or acid fracturing operation. The tracer is a component of a composite where it may be immobilized within a matrix (such as an emulsion) or porous particulate, onto a support or compressed with a binder into a solid particulate. The tracer may be slowly released from the composite.

17 Claims, No Drawings

US 10,989,040 B2

METHOD OF USING CONTROLLED RELEASE TRACERS

SPECIFICATION

This application is a divisional application of U.S. patent application Ser. No. 13/678,431, filed on Nov. 15, 2012, which claims the benefit of U.S. patent application Ser. No. 61/562,887, filed on Nov. 22, 2011.

FIELD OF THE INVENTION

The invention relates to a method of treating a wellbore or a subterranean formation wherein a fluid containing a controlled release tracer is pumped into the wellbore and/or subterranean formation.

BACKGROUND OF THE INVENTION

In a typical hydraulic fracturing treatment, a fracturing fluid containing a solid proppant is pumped into a formation penetrated by a wellbore at a sufficient pressure to cause the formation or enlargement of fractures in the reservoir. Typically, the subterranean formation has a plurality of production zones. During production of fluids from the well, it usually is desirable to establish communication with selected zones such that stimulation treatments do not inadvertently flow into a non-productive zone or a zone of diminished interest. Selective stimulation becomes pronounced as the life of the well declines and productivity of the well decreases.

Fractures radiate outwardly from the wellbore, typically from a few meters to hundreds of meters, and extend the surface area from which oil or gas drains into the well. The proppant is deposited in the fracture and prevents closure of the fracture. A conductive channel is then formed which extends from the wellbore into the formation being treated.

For certain formations, such as low permeability or "tight" formations (exemplified by gas shale reservoirs exhibiting complex natural fracture networks), wells are drilled horizontally and then subjected to one or more fracture treatments to stimulate production. Typically, when a horizontal well is fractured, the well is divided into several intervals exhibiting different permeability and each interval is stimulated independently.

Subterranean formations typically consist of solid rock fragments and the pore volume in between the rock fragments. The pore volume is generally filled with water, oil and/or gas. Due to density differences, hydrocarbons accumulate in the upper part of the reservoir and water occupies the pores paces below the hydrocarbon zone. During the production of hydrocarbons, water normally displaces the hydrocarbon. As oil wells mature, produced fluids contain greater volumes of water. At some point, the amount of water becomes too high and the production becomes non-profitable. At that point, the one zone is isolated and production within the next zone commences.

Reservoir Monitoring refers to the gathering and analysis of information from reservoirs during production. Such monitoring is used to assess the productivity of zones or producing formations from which fluids are being produced. Monitoring of produced fluids is important in order to increase efficiency of the fracturing operation. Reservoir Monitoring is further used to determine water saturation levels in the well.

In the past, methods of monitoring of produced fluids have used tracers which have been placed in packs in strategic areas within the well. See, for instance, U.S. Pat. Nos. 3,991,827; 4,008,763; 5,892,147 are U.S. Pat. No. 7,560,690. In addition to being restricted to near-wellbore production activity, the monitoring methods of the prior art have a short lifetime following placement of the tracer within the well. Further, the methods of the prior art are unacceptable for use in open hole wells, cumbersome and not particularly cost effective. In addition, the methods of the prior art do not provide a means for controlling the release of the tracer within the well. Alternatives have therefore been sought.

Methods of monitoring produced fluids in other well treatment applications, such as sand control, frac-packing and gravel packing are also desired.

SUMMARY OF THE INVENTION

The invention relates to a method of monitoring produced fluids by introducing a tracer into the subterranean formation during wellbore operations. The invention has applications in hydraulic fracturing where the tracer is a component of the fracturing fluid which is introduced into the formation under pressure to create or enlarge fractures. The invention further relates to use of a fluid containing a controlled release tracer in sand control, gravel packing and frac-packing operations.

The method may be used in the treatment of horizontal as well as deviated wells.

The tracer is either soluble in aliphatic and/or aromatic hydrocarbons or soluble in water. When fluid is produced, the tracer may desorb into its respective solubilizing liquid. Further, a combination of oil soluble and water soluble tracers may be simultaneously used in order to provide the ratio of oil:water being produced from each interval of the formation.

Fluids containing the tracer are used to monitor the amount and/or source of hydrocarbons produced from the formation as well as to monitor the amount and/or source of water production.

In an embodiment, a fluid containing a composite containing an immobilized controlled release tracer is pumped into the formation. The tracer is slowly released from the composite into fluid produced from the formation.

In one embodiment, the composite consists of one or more tracers immobilized onto a water-insoluble adsorbent. The water-insoluble adsorbent may have a surface area between from about 1 $m^2$/g to about 100 $m^2$/g. The weight ratio of the tracer to adsorbent in the composite may be between from about 9:1 to about 1:9.

In another embodiment, the composite consists of one or more tracers shaped as compressed particulates in a binder which, in turn, is adsorbed onto a water-insoluble adsorbent.

In another embodiment, the composite consists of one or more tracers immobilized in a porous particulate; the porosity and permeability of the porous particulate being such that the tracer(s) are absorbed into the interstitial spaces of the porous particulate. The porous particulate may be a porous ceramic, inorganic oxide or an organic polymeric material. Further, the porous particulate may be an aluminosilicate, silicon carbide, alumina or silica-based material.

In another embodiment, the composite may consist of one or more solid tracers immobilized in a microemulsion.

In still another embodiment, one or more solid tracers may be immobilized in a calcined porous metal oxide wherein the porosity and permeability of the calcined porous metal oxide is such that the solid tracer(s) are adsorbed into the interstitial spaces of the porous metal oxide. The surface area of the calcined porous metal oxide may be between from about 1 $m^2/g$ to about 10 $m^2/g$. The diameter of the calcined porous metal oxide may be between from about 0.1 to about 3 mm. The pore volume of the calcined porous metal oxide may be between from about 0.01 to about 0.10 g/cc.

DETAILED DESCRIPTION OF THE PREFERRED EMBODIMENTS

The methods, defined by the invention, use a fluid which contains a tracer. The tracer is typically soluble in either hydrocarbons or water. In an embodiment, however, a combination of oil soluble and water soluble tracers may be simultaneously used.

The tracer is typically a component of a composite where it is immobilized within a matrix (such as an emulsion) or porous particulate, onto a support or compressed with a binder into a solid particulate.

The tracer may be a solid or liquid. Where the tracer is a solid, the tracer may be dissolved in a suitable solvent. The tracer may slowly be released into the produced fluid as it is solubilized. Where the tracer is a liquid, the tracer is slowly released into the produced fluid, the rate of release being dependent upon the surface charges between the tracer and matrix or support.

In a preferred embodiment, solid composites containing the tracer are employed as proppants and exhibit the requisite strength and crush resistance characteristics of proppants. For example, the composites may exhibit crush resistance under closures stress conditions as high as 10,000 psi closure stress, API RP 56 or API RP 60, generally between from about 250 to about 8,000 psi closure stress, and may withstand temperatures greater than about 370° C. Typically, the specific gravity of the composite is less than or equal to 3.75 g/cc. Since the solid composite (excluding the tracer) may be insoluble, the composite may continue to function as a proppant even after the tracer has been completely leached out of the composite.

As produced fluid passes through or circulates around the composites, the tracer slowly dissolves over a generally constant rate over an extended period of time in the water or hydrocarbons which are contained in the formation and/or well. Thus, the composites are characterized by time-release capabilities which permit a continuous supply of the tracer into the targeted area. Generally, the lifetime of the composite of a single treatment after it is introduced into the formation is between six months and twelve months and may be in excess of three or five years depending upon the volume of fluid produced in the production well and the amount of tracer in the composite. Gradual dissolution of the tracers insures that they are available to produced fluids for extended periods of time.

The amount of tracer in the composite is normally from about 1 to 50 weight percent, preferably from about 14 to about 40 weight percent. In some instances, the amount of tracer in the composite may be as low as 1 ppm. Typically, the minimum amount of tracer in the fracturing fluid is that amount sufficient to permit detection within the produced fluid. The amount of composite present in the fracturing fluid is typically between from about 15 ppm to about 100,000 ppm.

The method may be used for monitoring different zones in oil and gas production wells and also for detection or early warning of phenomena such as water breakthrough. Upon production of fluid from the well, the produced fluid can be analyzed to determine productivity within the zone.

When multiple zones are being treated within the wellbore, distinguishable tracers may be introduced into different zones. The distinguishable tracers are selected such that a tracer in a fracturing fluid pumped into one zone is unable to mask the characteristics of a tracer in a fracturing fluid pumped into another zone. The term "zone" as used herein may refer to separate formations within a wellbore or separate areas within a single formation within the wellbore.

Tracers for use herein should be relatively safe to handle, cost effective and relatively inert in a formation. In addition, they should be easily identifiable (preferably both qualitatively and quantitatively) in produced fluids.

Since the tracers may be detected in recovered produced fluids, the method described herein does not require downhole equipment for detection. Monitoring of the tracers within produced fluids may be by visual inspection, chemical analysis, standard spectroscopy methods such as infrared, ultraviolet and mass spectroscopy, spectrophotometric methods, chromatography (including liquid chromatography), ultraviolet light, fluorescence spectroscopy, electrochemical detection, infrared, radioactive analysis, x-ray analysis, PCR techniques combined with sequential analysis, electron capture detection or optical fibers. The selected detection method is based on the properties of the tracer in the fracturing fluid. For instance, where the tracer is an aromatic compound, the method of detection is preferably by ultraviolet light. Where the tracer exhibits fluorescence, the detection method may be by fluorescence spectroscopy.

Suitable tracers include dyes (such as phenoxazone dyes, fluorescein, pyridinium betaines dyes, solvatochromatic dyes, Oregon Green, Cascade Blue, Lucifer yellow, Auramine O, tetramethylrhodamine, pysranine, sulforhodamines, hydroxycoumarins; polysulfonated pyrenes; cyanines, hydroxylamines, netural red, acridine orange), gases (such as helium and carbon dioxide); acids (such as picric acid and salicylic acid) or salts thereof; ionizable compounds (such as those which provide ammonium, boron, chromate, etc., ions); and radioactive materials (such as krypton-85); isotopes; genetically or biologically coded materials; microorganisms; minerals; and high molecular weight synthetic and natural compounds and polymers (such as oligonucleotides, perfluorinated hydrocarbons like perfluoro butane, perfluoro methyl cyclopentane and perfluoro methyl cyclohexane).

The tracer may also be a chelate, such as ethylenediaminetetraacetic acid (EDTA)) or a salt thereof. U.S. Pat. No. 4,264,329, herein incorporated by reference, discloses acceptable metal chelates formed by reacting aryl substituted ethylenediaminetetraacetic acid and a metal ion selected from the consisting of lead, cadmium and zinc. Such chelates react with fluorogenic agents, such as fluorescamine and o-phthalaldehyde. Fluorescence spectroscopy is then used to detect the chelate.

Tracers may further be chemically modified such that they may more easily be immobilized within the composite. For example, tracers may be chemically modified in order that they may be more effectively linked to a substrate.

The amount of composite present in the fracturing fluid is typically between from about 15 ppm to about 100,000 ppm. Suitable composites are those capable of providing a means of slowly releasing the tracer into the subterranean formation. The tracer in such composites is preferably liquid. If the tracer is a solid, it can be dissolved in a suitable solvent, thus making it a liquid.

Composite of Porous Particulates.

Suitable composites include those composed of a porous particulate and at least one tracer. Typically, the particle size of the porous particulate is between from about 0.3 mm to about 5 mm, preferably between from about 0.4 to about 2 mm. The porosity and permeability of the porous particulate is such that the tracer may be absorbed into the pores of the porous particulate material. Typically, the porosity of the porous particulate is between from about 5 to about 30 volume percent. A commercially available instrument which uses mercury intrusion, such as the AutoPore Mercury Porosimeter (Micromeritics, Norcross, Ga.), for measuring the internal porosity of the particulate and the interstitial volume (of a pack) may be used to determine the porosity of the porous particulate. Generally, the amount of tracer in the composite is from about 0.05 to about 5 (preferably from about 0.1 to about 2) weight percent based upon the total weight of the composite.

Examples of types of materials suitable for use as porous particulates include particulates having a porous matrix. The porous particulates are generally spherical and insoluble in well fluids under subterranean conditions, such as at temperatures less than about 250° C. and pressures less than about 80 MPa. The particulates may be sufficiently strong to be used on their own at high pressures. They may further be used in conjunction with tracers including non-porous proppant materials, such as sand. Since the tracers employed in the composites are capable of being absorbed into the interstitial spaces of the porous particulates, they may be slowly released from the porous particulates into produced fluids. Produced fluids may therefore be exposed to a continuous supply of tracer.

Suitable as porous particulates are those particulates set forth in U.S. Pat. Nos. 5,964,291 and 7,598,209, herein incorporated by reference. For instance, the porous particulate of the composite may be any naturally occurring or manufactured or engineered porous ceramic particulate, as well as any organic polymeric material, that has an inherent and/or induced porosity and exhibits the requisite physical properties, such as particle characteristics, desired strength and/or apparent density, to fit particular downhole conditions.

Suitable as inorganic ceramic materials are alumina, magnetic glass, titanium oxide, zirconium oxide, silicon carbide, aluminosilicates and other silica-based materials. Examples of non-natural porous particulate materials include, but are not limited to, porous ceramic particles, such as fired kaolinitic particles, as well as partially sintered bauxite. The porous particulates may further be porous natural ceramic materials, such as lightweight volcanic rocks, like pumice, as well as perlite and other porous "lavas" like porous (vesicular) Hawaiian Basalt, porous Virginia Diabase and Utah Rhyolite. Such naturally occurring materials may be strengthened or hardened by use of modifying agents to increase the ability of the naturally occurring material to resist deformation. A starch binder may be employed.

Suitable polymeric materials for use as the porous particulate include thermosetting resins, such as polystyrene, a styrene-divinylbenzene copolymer, a polyacrylate, a polyalkylacrylate, a polyacrylate ester, a polyalkyl acrylate ester, a modified starch, a polyepoxide, a polyurethane, a polyisocyanate, a phenol formaldehyde resin, a furan resin, or a melamine formaldehyde resin.

In a preferred embodiment, the porous particulate material is a relatively lightweight or substantially neutral buoyant particulate material. The term "relatively lightweight" shall refer to a particulate that has an ASG (API RP 56) that is substantially less than a conventional particulate material employed in well treatment operations, e.g., sand (having an ASG, API RP 60, of 2.65) or bauxite (having an ASG of 3.55). The ASG of a relatively lightweight material is preferably less than about 2.4, more preferably less than or equal to 2.0, even more preferably less than or equal to 1.75, most preferably less than or equal to 1.25.

When used in a hydraulic fracturing operation, the porous particulate is selected so as to optimize geometries to achieve enhanced well productivity, such as to achieve increased propped fracture length in relatively "tight" gas formations. Choice of different particulate materials and amounts thereof to employ in such blends may be made based on one or more well treatment considerations including, but not limited to, objectives of well treatment, such as creation of propped fractures, well treatment fluid characteristics, such as apparent specific gravity and/or rheology of carrier fluid, well and formation conditions such as depth of formation, formation porosity/permeability, formation closure stress, type of optimization desired for geometry of downhole-placed particulates such as optimized fracture pack propped length, optimized sand control pack height, optimized fracture pack and combinations thereof. Typically, the specific gravity of the tracer is ±0.25 g/cc of the proppant in order to insure the desired placement within the proppant pack.

The composites may be prepared by conventional processes, such as electrofusion, spray-drying and pelletization. In a preferred embodiment, the composites are prepared by placement of the porous particulate into a dilute solution or suspension of the tracer and permitting the porous particulate to imbibe the tracer.

Composites of Solid Adsorbents.

The composite may further contain a tracer adsorbed onto a water-insoluble adsorbent such that the tracer may be slowly released from the adsorbent upon introduction of the composite into the fracture. The controlled slow release of the tracer may be dependent upon the surface charges between the tracer and support which, in turn, may be dependent on the adsorption/desorption properties of the tracer to adsorbent, pH variations, salinity, hydrocarbon composition, temperature, and pressure.

The amount of tracer in the composite is that amount sufficient to effectuate the desired result over a sustained period of time. Generally, the amount of tracer in the composite is from about 0.05 to about 5 (preferably from about 0.1 to about 2) weight percent based upon the total weight of the composite.

The water insoluble adsorbent may be any of various kinds of commercially available high surface area materials having the affinity to adsorb the tracer. Typically, the surface area of the adsorbent of the tracer is between from about 1 $m^2/g$ to about 100 $m^2/g$.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents. Particularly preferred are diatomaceous earth and ground walnut shells.

Further useful as adsorbents are clays such as natural clays, preferably those having a relatively large negatively charged surface, and a much smaller surface that is positively charged. Other examples of such high surface area materials include such clays as bentonite, illite, montmorillonite and synthetic clays.

The weight ratio of tracer to water-insoluble adsorbent is generally between from about 90:10 to about 10:90.

The composite may be prepared by adding the tracer to the adsorbent and mixing until the tracer is readily absorbed. The product may then be dried at elevated temperatures (for instance, from about 220° F. to about 250° F. until the percent moisture of the resulting product is less than 3%.

The composite has limited solubility in water (when produced water is being detected or measured) or hydrocarbons (when produced hydrocarbons are being detected or measured). When placed into a production well, the tracer slowly dissolves at a generally constant rate over an extended period of time in the water which is contained in the formation. The controlled slow release of the agent is dependent upon the surface charges between the tracer and adsorbent which, in turn, is dependent upon the adsorption/desorption properties of the tracer to adsorbent.

Calcined Metal Oxides.

The composite may further be composed of a tracer and a calcined metal oxide. Such composites include those wherein a tracer is adsorbed onto a nano-sized calcined porous substrate of high surface area. The tracer is slowly released from the adsorbent and may be slowly released.

The porosity and permeability of the calcined porous substrate is such that the tracer may also be absorbed into the interstitial spaces of the porous substrate. Typically, the surface area of the calcined porous substrate is between from about 1 $m^2/g$ to about 10 $m^2/g$, preferably between from about 1.5 $m^2/g$ to about 4 $m^2/g$, the diameter of the calcined porous substrate is between from about 0.1 to about 3 mm, preferably between from about 150 to about 1780 micrometers, and the pore volume of the calcined porous substrate is between from about 0.01 to about 0.10 g/cc. The porous metal oxide is typically spherical and insoluble in well fluids under subterranean conditions, such as at temperatures less than about 250° C. and pressures less than about 80 MPa.

The porous substrate may be a metal oxide, such as alumina, zirconium oxide and titanium oxide. Typically, the porous substrate is alumina.

The adsorbent may be prepared by:
(a) mixing a metal oxide hydrosol (such as aluminum oxide hydrosol) containing a hydrate of the metal oxide or activated metal (such as activated alumina) and an additive component selected from carbon (such as carbon black) or a high molecular weight natural organic material (such as wood flour and starch) which is insoluble in aqueous solution up to a temperature of 50° C. and carbon with a solution of hydrolyzable base to form a mixture;
(b) introducing the mixture in dispersed form into a water-immiscible liquid having a temperature of from about 60° to 100° C., whereby gel particles are formed;
(c) aging the gel particles in the liquid at the temperature and subsequently in an aqueous base, such as an aqueous ammonia solution;
(d) recovering the aged particles; and then
(e) calcining the recovered particles. During calcination, the additive component is removed. The calcined particles have a lower bulk density when the additive component is present during calcinations than when the additive component is not present. Typically, the bulk density of the composite is between from about 75 to about 150 lb/ft³. In addition, combustion of the additive component during calcinations of the hydrosol results in formation of pores of the calcined metal oxide.

The metal oxide hydrosol may optionally contain a silica-containing substance which in their non-soluble form is coprecipitated with the metal oxide particles. The silica-containing substance is preferably a low density silica, such as that prepared by hydrolysis of silicon tetrachloride in an oxyhydrogen flame and known under the designation pyrogenic silica.

In an embodiment, spherical metal oxide adsorbent may be prepared from a concentrated metal oxide hydrosol of a pH value in the range of about 3 to about 5 which, in turn, is prepared by dissolving metal in hydrochloric acid and/or metal chloride in aqueous solution or by dissolving metal hydroxychloride in water, the concentration of which is adjusted so that metal oxide derived from the sol amounts to 15 to 35% by weight, preferably to 20 to 30% by weight of the mass of the calcined particles. Metal oxide hydrate and/or activated metal, preferably of an average particle diameter of maximally 10μ, is then added to the hydrosol in an amount so that the metal oxide content amounts to 65 to 85% by weight, preferably 70 to 80% by weight of the calcined particles. Optionally, pyrogenic silica may be added to the hydrosol such that the $SiO_2$ content of the calcined particles amounts to 10 to 40% by weight. A soft to medium-hard wood flour may then added to the mixture, the wood flour being ground to a finer particle size such that it is present in a quantity of 5 to 35% by weight, preferably 10 to 25% by weight relative to the mass of the calcined particles. The hydrosol containing the wood flour may then be mixed with a concentrated aqueous solution of hexamethylene tetraamine and then sprayed or dropped into a column filled with the mineral oil of a temperature of 60° C. to 100° C. The gel particles are then allowed to remain at the temperature of precipitation for a period of time from 4 to 16 hours; thereafter the gel particles are aged for 2 to 8 hours in aqueous ammonia solution, washed with water, dried at 100° C. to 150° C., or preferably at from about 120° C. to about 200° C., preheated to 250° C. to 400° C. and calcined at a temperature of 600° C. to about 1000° C.

Alternative methods for making metal oxide adsorbent are further disclosed in U.S. Pat. No. 4,013,587, herein incorporated by reference.

In a preferred embodiment, when the metal oxide adsorbent is alumina adsorbent, the adsorbent may be prepared by hydrolyzing aluminum alkoxides to render nano sized alumina, drying to remove water and then introducing the dried aluminum in a dispersed form into an oil at a temperature of from about 60° to 100° C., whereby gel particles are formed. The gel particles are then aged in the liquid and subsequently in an aqueous ammonia solution, recovered and then calcined. Nano sized alumina may be produced having an average diameter in the range from about 0.4 mm to about 1 mm.

Generally, the amount of tracer in the composite is from about 0.05 to about 5 (preferably from about 0.1 to about 2) weight percent based upon the total weight of the composite. The concentration of the tracer in the wellbore is between from about 1 to about 50 ppm and may be as low as 1 ppm. Such small amounts of tracer may be sufficient for up to 1,000 pore volumes.

The composites may be prepared by first adsorbing water onto adsorbent until the adsorbent appears wet followed by the addition of the tracer. The product may then be dried at elevated temperatures (for instance, from about 220° F. to about 250° F. until the percent moisture of the resulting product is less than 3%.

Shaped Composites.

The composite described in the above sections may be in any form or shape. In a preferred embodiment, the composite is formed into a shaped compressed composite by adding the composite to a binder and subjecting the resultant product to compression.

Suitable binders may be an organic binder or inorganic binder. Typical organic binders are those selected from resole or novolac resins, such as phenolic resole or novolac resins, epoxy-modified novolac resins, epoxy resins, polyurethane resins, alkaline modified phenolic resoles curable with an ester, melamine resins, urea-aldehyde resins, urea-phenol-aldehyde resins, furans, synthetic rubbers, silanes, siloxanes, polyisocyanates, polyepoxys, polymethylmethacrylates, methyl celluloses, crosslink entangled polystyrene divinylbenzenes, and plastics of such polymers as polyesters, polyamides, polyimides, polyethylenes, polypropylenes, polystyrenes, polyolefins, polyvinyl alcohols, polyvinylacetates, silyl-modified polyamides and, optionally, a crosslinking agent. Typical inorganic binders include silicates, e.g., sodium silicate, aluminosilicates, phosphates, e.g., polyphosphate glass, borates, or mixtures thereof, e.g., silicate and phosphate.

The amount of binder added to the composite to form the shaped compressed composite is typically from about 0.5 to about 50, preferably from about 1 to about 5 percent based on the total weight of the binder and composite, prior to compression.

The shaped particulates may be produced by procedures known in the art. Typically the shaped particulates are formed by combining the composite and, optional, weighting agent, with a binder and then compressing the mixture in a mold of the desired shape or extruding the mixture into its desired shape.

Exemplary of the process for making the shaped compressed composite is to combine the composite, prepared in accordance with the teachings set forth in U.S. Pat. Nos. 7,493,955 or 7,494,711, with an organic binder and then compressing the mixture at a temperature between from about 20° C. to about 50° C. at a pressure of from between 50 to about 5000 psi. The hardened particulates may then be screened to the desired size and shape. In another preferred embodiment, the shaped composites are produced by a continuous extrusion at a temperature between from about 400° C. to about and 800° C.

The shaped composites may further be coated with a resin, plastic or sealant which is resistant to the hydrocarbons produced in the well. Suitable resins include phenolic resins like phenol formaldehyde resins, melamine formaldehyde resins, urethane resins, epoxy resins, polyamides, such as nylon, polyethylene, polystyrene, furan resins or a combination thereof.

The coating layer serves to strengthen the compressed composite, protect the shaped composite from harsh environmental conditions, protect the shaped composite from rupturing as it is lowered into the well and to lengthen the time of release of the tracer from the shaped compressed composite. The coating layer may be applied to the shaped composite by mixing the shaped composite and coating material in a vessel at elevated temperatures, typically from about 200 to about 350, preferably around 250° F. An adherent, such as a resin adhesive or tackifying resin, may further be added to the vessel during mixing. The adherent may be used to assist the adhesion of the coating onto the compressed composite. Alternatively, the coating layer may also be applied as a spray in a solvent based coating on the shaped compressed composite and then dried to remove the solvent.

The tracer is slowly released from the shaped compressed composite after being introduced into a targeted area in the well. The targeted area may be a site in the well where deposits have already formed or a location in the well where it is desirable for deposits not to form. The shaped compressed composite provides a continuous supply of the tracer into the targeted area.

The shaped compressed composite is preferably a pellet and may be in the form of a sphere, cylinder, rod or any other shape which allows for the slow release of the tracer into the targeted area. In some applications, the shaped compressed composite are cylindrically shaped having a length of about 0.5 inch to about 6 inches, preferably from about 1 inch to about 2 inches and a diameter of from about 0.25 inch to about 4 inches, preferably from about 0.5 inch to about 1 inch.

The specific gravity of the shaped compressed composite is generally between from about 1.1 to about 3. In a preferred embodiment, the specific gravity of the shaped compressed composite is between from about 2 to about 2.5.

Composites as Microemulsions.

The composite containing the tracer may further be contained in an emulsion wherein the tracer is in the discontinuous phase or the continuous stage of the emulsion. Suitable emulsions are those set forth in U.S. Pat. No. 7,380,606 and U.S. Patent Publication No. 2008/0287324, both of which are herein incorporated by reference.

Preferred emulsions include those containing emulsified solvent-surfactant blends prepared by combining a solvent-surfactant blend and a diluent. The emulsified solvent-surfactant blend may be combined with a water-based or oil-based carrier fluid to form a microemulsion.

The solvent-surfactant blend generally includes a solvent, a surfactant and an alcohol. In one embodiment, the solvent is selected from the group of unsaturated aliphatic cyclic hydrocarbons known as terpenes, including monoterpenes and diterpenes such as monoterpene d-limonene ($C_{10}H_{16}$). Alternatively, the terpene-based solvent may be replaced with alkyl, cyclic or aryl acid esters of short chain alcohols, such as ethyl lactate and hexyl ester.

If a water-based carrier fluid is chosen, the surfactant of the solvent-surfactant blend should be capable of creating an oil-in-water microemulsion upon combination with an appropriate quantity of water. Preferred surfactants are biodegradable and have an HLB (hydrophile-lipophile balance) value of between about 8 to about 20. Preferred surfactants may be cationic, anionic, zwitterionic, or nonionic. Presently preferred oil-in-water surfactants include one or more of the following: Tween® 40 (polyoxyethylene sorbitan monopalmitate), Tween® 60 (polyoxyethylene sorbitan monostearate), Tween® 80 (polyoxyethylene sorbitan monooleate), linear alcohol alkoxylates, alkyl ether sulfates, dodecylbenzene sulfonic acid (DDBSA), linear nonyl-phenols, dioxane, ethylene oxide, polyethylene glycol, and ethoxylated castor oils such as PEG castor oil. A preferred oil-in-water surfactant mixture includes polyoxyethylene sorbitan monopalmitate, ethoxylated castor oil and polyethylene glycol.

Alternately preferred oil-in-water surfactants can also include dipalmitoyl-phosphatidylcholine (DPPC), sodium 4-(1' heptylnonyl) benzenesulfonate (SHPS or SHBS), polyoxyethylene (8.6 mole) nonyl phenyl ether, AEROSOL® OT (sodium dioctyl sulfosuccinate), tetraethyleneglycoldodecylether, sodium octylbenzenesulfonate (OBS), sodium hexadecyl sulfate (SCS), IsalChem® 145 (PO) (isomeric primary alcohol (oxypropylene surfactant)), sodium alkyl ether sulfate, sodium laureth sulfate POE(2) (SLES), ethylene oxide (EO), sulfonates (i.e., alkyl propoxy-ethoxysulfonate), alkyl propoxy-ethoxysulfate, alkylaryl-propoxy-ethoxysulfonate and highly substituted benzene sulfonates (n-C12-oxylene-$SO_3$—).

If an oil-based carrier fluid is chosen, the surfactant of the solvent-surfactant blend should be capable of creating a water-in-oil microemulsion upon combination with oil. Preferred surfactants may be cationic, anionic, zwitterionic, or nonionic. Preferred surfactants are biodegradable and have an HLB value of between about 3-8. Presently preferred water-in-oil surfactants include Span® 40 (sorbitan monopalmitate), Span® 60 (sorbitan monostearate), Span® 80 (sorbitan monooleate), linear alcohol alkoxylates, ethoxylated castor oil, and polyethylene glycol. A preferred water-in-oil surfactant mixture includes sorbitan monopalmitate, ethoxylated castor oil and polyethylene glycol.

The alcohol component of the solvent-surfactant blend serves as a coupling agent between the solvent and the surfactant, thereby stabilizing the microemulsion. The alcohol also lowers the freezing point of the microemulsion. Although isopropanol is presently preferred, alternative suitable alcohols include midrange primary, secondary and tertiary alcohols with between 1 and 20 carbon atoms, such as t-butanol, n-butanol, n-pentanol, n-hexanol and 2-ethylhexanol. Other freeze prevention additives can additionally or alternatively be added, such as detergent range alcohol ethoxylates, ethylene glycols (EG), polyethylene glycols (PEG), propylene glycols (PG) and triethylene glycols (TEG), with triethylene glycol being presently preferred.

The solvent-surfactant blend optionally includes a salt. The addition of a salt to the solvent-surfactant blend reduces the amount of water needed as a carrier fluid and also lowers the freezing point of the microemulsion. Among the salts that may be added for stability and co-solvent substitution, NaCl, KCl, $CaCl_2$, and $MgCl_2$ are presently preferred. Others suitable salts can be formed from K, Na, Zn, Br, Sr, Cs, Li, and Ca families.

After blending the solvents, surfactants and alcohols, it may be desirable to form a diluted solvent-surfactant blend by adding a diluent before addition to the carrier fluid. Presently preferred diluents include water and water and triethylene glycol (TEG) mixtures. A particularly preferred diluent is 90% by volume water and 10% by volume triethylene glycol. It will be understood that upon addition of the diluent, the solvent-surfactant blend may partially or completely emulsify. It will also be understood that complete emulsification includes, without limitation, microemulsification.

For oil-in-water microemulsions, the solvent-surfactant blend preferably includes about 36%-76% by volume of the surfactant, about 14%-54% by volume solvent, and about 0%-20% alcohol by volume. In a particularly preferred embodiment, the oil-in-water solvent-surfactant blend includes about 56% by volume of the preferred oil-in-water surfactant mixture (polyoxyethylene sorbitan monopalmitate, ethoxylated castor oil and polyethylene glycol), about 34% by volume d-limonene, ethyl lactate or combinations thereof, and about 10% by volume isopropanol.

In an alternatively preferred embodiment, the oil-in-water solvent-surfactant blend is diluted with about 0%-50% by volume of diluent. The diluted solvent-surfactant blend preferably includes water and more preferably includes about 45% by volume water and about 5% by volume triethylene glycol. Accordingly, the preferred diluted solvent-surfactant blend includes about 27% by volume of the preferred oil-in-water surfactant mixture, about 17% by volume d-limonene, about 5% by volume isopropanol, about 45% by volume water and about 5% by volume triethylene glycol.

For water-in-oil microemulsions, the solvent-surfactant blend preferably includes about 36%-76% by volume of the surfactant, about 14%-54% by volume solvent and about 0%-20% by volume alcohol. In a particularly preferred embodiment, the water-in-oil solvent-surfactant blend includes about 56% by volume of the preferred water-in-oil surfactant mixture (sorbitan monopalmitate, ethoxylated castor oil and polyethylene glycol), about 34% by volume d-limonene, ethyl lactate or a combination of d-limonene and ethyl lactate, and about 10% by volume isopropanol. The water-in-oil solvent-surfactant blend forms a microemulsion upon combination with diesel or kerosene to form a preferred water-in-oil microemulsion.

In an alternatively preferred embodiment, the water-in-oil solvent-surfactant blend is combined with about 0%-50% by volume of a diluent prior to adding the carrier fluid to form a diluted water-in-oil solvent-surfactant blend. More preferably, about 50% by volume of diluent is added to the water-in-oil solvent-surfactant blend. The diluent is preferably an oil-based fluid such as diesel, kerosene, jet fuel, crude oil, condensate, an ester, linear-.alpha.-olefin, poly-.alpha.-olefin, internal olefin, paraffin, linear alkyl benzene, esther, acetal, or other synthetic. In a preferred embodiment, diesel or condensate is used as a diluent. It will be understood that upon addition of the diluent, the water-in-oil solvent-surfactant blend may partially or completely emulsify. It will also be understood that complete emulsification includes, without limitation, microemulsification.

In a preferred embodiment, the emulsion is a thermally stable microemulsion formed by the combination of solvent-surfactant blends with an oil-based fluid. The oil phase may form either the continuous or discontinuous phase of the microemulsion. The microemulsion may be considered as small-scale versions of emulsions, i.e., droplet type dispersions either of oil-in-water or water-in-oil with an average particulate size ranges in the order of about 5 to about 50 nm in drop radius. In emulsions, the average drop size grows continuously with time so that phase separation ultimately occurs. The drops of the emulsion are generally large (>0.1 microns) and often exhibit a milky or cloudy, rather than a translucent, appearance as seen in microemulsions.

The particle size of the tracer in the emulsion is normally between from about 0.001 microns to about 100 microns. In some instances, the particle size of the tracer is less than or equal to 0.05 microns.

The water-in-oil microemulsion may be a solvent-surfactant blend added to an aqueous diluent. The solvent-surfactant blend may, optionally, contain an alcohol. The solvent-surfactant blend may include from about 35 to about 80% by volume of surfactant, from about 14% to about 54% by volume solvent and from 0 to about 20% by volume alcohol. The amount of water in the water-in-oil microemulsion is typically no greater than 50 volume percent, preferably no greater than about 30 volume percent. The amount of hydrocarbon in the oil-in-water microemulsion is typically no greater than 50 volume percent, preferably no greater than about 30 volume percent.

To the base water-in-oil microemulsion, a water-based tracer is added with minimal mixing when the tracer preferentially gets into the water phase of the microemulsion. Similarly, to a base oil-in water microemulsion, a hydrocarbon based tracer can be added with minimal mixing, when the tracer gets into the hydrocarbon phase of the microemulsion.

The solvent-surfactant blends, dilute or concentrated, can be added to the water and oil-based carrier fluids in sparing amounts to prepare the desired microemulsions. For example, in many applications, as little as 0.2%-2% by volume of solvent-surfactant blend in water or oil based-carrier fluids will be sufficient. In other applications, however, it may be desirable to use a more concentrated microemulsion. In such applications, the microemulsion preferably includes about 0.5% to about 90% of the selected solvent-surfactant blend. In another preferred application, the microemulsion includes about 0.05% to about 50% by volume of the solvent-surfactant blend. Furthermore, it will be understood that in some applications, it may be desirable to apply the solvent-surfactant blend, diluted or concentrated, without the addition of a carrier fluid. For example, the solvent-surfactant blend can be pumped downhole where it will incorporate water and water-based materials to form the microemulsion in situ. Once formed, the microemulsion can be pumped from the wellbore to the surface. In another embodiment, the solvent-surfactant blend can be injected downhole via a capillary injection assembly and to mix in situ with water or oil-based fluid, to form the microemulsion.

The tracer is added to the microemulsion prior to its introduction into the well. The amount of tracer in the microemulsion is normally from about 2 to 20 weight percent, preferably from about 3 to about 12 weight percent, more preferably from about 4 to about 8 weight percent.

The amount of microemulsion in the treatment fluid is typically between from about 15 ppm to about 100,000 ppm.

When placed into a well, the tracer slowly demulsifies from the microemulsion at a generally constant rate over an extended period of time into the water or hydrocarbons which are contained in the formation, well, conduit or vessel. The microemulsion therefore permits a continuous supply of the tracer into the targeted area.

The composite containing the tracer is carried into the well and/or formation in a water-based or oil-based carrier fluid. Water-based carrier fluids include fresh water and brine. Oil-based carrier fluids include liquid hydrocarbons such as diesel, kerosene, jet fuel, crude oil, and condensate as well as synthetic fluids like esters, linear α-olefins, poly-α-olefins, internal olefins, paraffins, linear alkyl benzenes, esthers and acetals. In addition, the carrier fluid may be a gas such as nitrogen or carbon dioxide. The fluid may be gelled or non-gelled. In one embodiment, the composite may be introduced or pumped into a well as neutrally buoyant particles in the carrier fluid.

The fluid may further include gelling agents, cross-linking agents, gel breakers, surfactants, foaming agents, demulsifiers, buffers, clay stabilizers, acids, or mixtures thereof.

The composites defined herein enable measurement of formation and/or water (including injection water) from various zones in a hydrocarbon reservoir. For instance, when used in multiple zones in a hydraulic fracturing operation, the composites inform the operator of zones of reduced productivity. Further, the presence of dispersed oil in produced water may be detected using the composites defined herein at less than 5 ppm.

Use of the composites makes it possible to distinguish between produced injection water and formation water from each zone. The tracers will be released gradually during production of the individual fluids in each specific zone.

The composites defined herein may be used to monitor produced water, oil and gas for flow assurance and for maintaining regulatory compliance. The ability to analyze the fluids on-site, quickly and frequently, further assists operators to detect flow assurance, asset integrity and process problems early enabling them to take preventative action to minimize the risks of production loss.

In addition to their use in hydraulic fracturing, the fluids may be used in well treating applications near wellbore in nature (affecting near wellbore regions) and may be directed toward improving wellbore productivity and/or controlling the production of formation sand. Particular examples include gravel packing and "frac-packs." Typical gravel packing and frac packing methods are set forth in U.S. Pat. Nos. 3,987,854; 4,606,408; and 4,627,488, incorporated herein by reference.

In gravel packing, the composite may be used to pre-pack a screen for use in gravel packed wells to prevent the passage of formation particles or unconsolidated materials from the subterranean formation into the wellbore during production of fluids from the formation. Gravel packing is essentially a technique for building a two-stage filter downhole. The filter consists of gravel pack sand and a screen or liner. The gravel pack sand is sized according to the particle size distribution of the unconsolidated materials. One method of selecting gravel pack size is discussed in U.S. Pat. No. 3,670,817, entitled "Method of Gravel-Packing A Production Well Borehole", incorporated herein by reference. The screen or liner has openings that are sized to retain the gravel pack sand. Thus the gravel pack particulates retains the unconsolidated formation materials and the screen or liner retains the gravel pack particulates sand. The gravel pack particulates and the screen or liner act together to reduce or eliminate the production of the unconsolidated formation materials with the oil or gas production.

The slurry introduced into the well containing the composite further contains the immobilized tracer. Exemplary of a gravel pack operation using a slurry containing the composite is one where the slurry containing the particulates, composite and tracer is pumped at a low rate, for instance, about 2 to about 4 barrels per minute. The slurry is then pumped into the workstring within the well until the slurry is within about 150 to about 300 feet of the primary port. Positioning of a crossover service tool allows the slurry to travel into the screen/casing annulus. Particulates are retained by the screen or liner and the remaining fluid leaks off into the formation allowing a tightly packed sand filter to remain in place. Monitoring of the immobilized tracer provides information of the type and amount of the produced fluid from the formation.

In a frac pack operation, an unconsolidated formation is hydraulically fractured while a two-stage filter of gravel pack is simultaneously built. In frac packing, the processes of hydraulic fracturing and gravel packing are combined into a single treatment to provide stimulated production and an annular gravel pack to reduce formation sand production. In some cases, the treatments are completed with a gravel pack screen assembly in place, and the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation. Typically, the slurry is pumped at higher rates than used in gravel packing, about 6 to about 12 barrels per minute.

Further, the fluid described herein may be used in combination with an acid in an acid fracturing operation. The acid is a corrosive, very low pH acid which reacts with the surrounding formation. The method is particularly effective with sandstone and carbonate formations. Acids such as hydrochloric acid, formic acid, and acetic acid are injected at high rates and pressures into the formation with the fluid to intentionally cause the formation to fail by inducing a fracture in the subterranean rock. In another embodiment, the fluid of the invention may contain the acid. Fractures, originating adjacent to the wellbore, initiate as two wings growing away from the wellbore in opposite directions. The acid is used to dissolve or etch channels or grooves along the fracture face so that after pressure is relieved and the fracture heals, there continues to exist non-uniform highly conductive channels, allowing unrestrained hydrocarbon flow from the reservoir to the wellbore. In contrast, with propped fracturing, fracture conductivity is maintained by propping open the created fracture with a solid material, such as sand, bauxite, ceramic, and certain lighter weight materials. Conductivity in acid fracturing is obtained by etching of the fracture faces with an etching acid instead of by using proppants to prevent the fracture from closing. Monitoring of the immobilized tracer provides information of the type and amount of the produced fluid from the formation and the success of the acid fracturing operation.

Additional amounts of fluid containing the tracer may be injected into the formation anytime after the initial charge of tracer in the composite has at least partially depleted. Typically, the additional tracer is introduced when the tracer adsorbed onto a support or within an emulsion or within the interstitial spaces of the composite has been substantially depleted and the performance level of the tracer in the composite has become unacceptable.

The injection of additional tracer can be carried out in any conventional method of injecting fluids into a wellbore of an oil or gas well. The fluid which is injected will typically be comprised of the desired tracer(s) in a solution which further comprises a solvent. The relative amounts of the solvent and treatment agent of the solution to be injected into the wellbore will of course vary depending upon the agent and solvent involved, but will typically be of a solvent to tracer ratio in the range of about 10:90 to about 95:5, by weight. After the injection step is carried out, the wellbore is pressurized for a time and under conditions sufficient to reactivate the downhole matrix in the formation.

What is claimed is:

1. A sand control method for a wellbore penetrating a subterranean formation, comprising
   (a) introducing into the wellbore a slurry comprising a composite having an immobilized solid tracer onto a substrate or within a matrix which is either hydrocarbon soluble, water soluble or both water soluble and hydrocarbon soluble and further wherein the solid tracer is capable of being slowly solubilized into fluids produced from the well and wherein the composite either comprises:
      (i) the tracer adsorbed onto a water-insoluble adsorbent substrate, the water-insoluble adsorbent having a surface area between from about 1 $m^2/g$ to about 100 $m^2/g$;
      (ii) the tracer absorbed into the pores within a porous particulate;
      (iii) the tracer adsorbed onto a calcined porous metal oxide substrate, the surface area of the calcined porous metal oxide substrate being between from about 1 $m^2/g$ to about 10 $m^2/g$ and the diameter of the calcined porous metal oxide substrate being between from about 0.1 to about 3 mm; or
      (iv) a microemulsion comprising the tracer and an emulsified solvent-surfactant blend wherein the particle size of the tracer in the microemulsion is between from about 0.001 microns to about 100 microns;
   (b) placing the slurry adjacent the subterranean formation to form a fluid-permeable pack capable of reducing or substantially preventing the passage of formation particles from the subterranean formation into the wellbore while allowing passage of formation fluids from the subterranean formation into the wellbore; and
   (c) solubilizing the solid tracer into hydrocarbons or water in the formation or well over a period between 6 months and five years; and
   (d) monitoring the solubilized immobilized tracer in fluids removed from the well.

2. The method of claim 1, wherein the tracer is immobilized in a microemulsion.

3. The method of claim 1, wherein the solid tracer is adsorbed onto a water-insoluble adsorbent wherein the water-insoluble adsorbent has a surface area between from about 1 $m^2/g$ to about 100 $m^2/g$.

4. The method of claim 3, wherein the weight ratio of the solid tracer to adsorbent in the composite is between from about 9:1 to about 1:9.

5. The method of claim 1, wherein the solid tracer is within a shaped compressed pellet comprising the composite and a binder.

6. The method of claim 1, wherein the solid tracer is absorbed into the pores of a porous particulate.

7. The method of claim 6, wherein the porous particulate is a porous ceramic, inorganic oxide or an organic polymeric material.

8. The method of claim 7, wherein the porous particulate comprises a porous ceramic, polystyrene, styrene-divinylbenzene copolymer, a polyacrylate, a polyalkylacrylate, a polyacrylate ester or a polyalkyl acrylate ester.

9. The method of claim 6, wherein the porous particulate is an aluminosilicate, silicon carbide, alumina or silica-based material.

10. The method of claim 1, wherein the solid tracer is immobilized in a calcined porous metal oxide wherein the porosity and permeability of the calcined porous metal oxide is such that the solid tracer is adsorbed into the interstitial spaces of the porous metal oxide and further wherein:
    (a) the surface area of the calcined porous metal oxide is between from about 1 $m^2/g$ to about 10 $m^2/g$; and
    (b) the diameter of the calcined porous metal oxide is between from about 0.1 to about 3 mm.

11. The method of claim 10, wherein the pore volume of the calcined porous metal oxide is between from about 0.01 to about 0.10 g/cc.

12. A sand control method for a wellbore penetrating a subterranean formation comprising:
    (a) pumping into a workstring within a well a slurry comprising gravel pack sand particulates and a composite having a pre-determined immobilized solid tracer wherein the pre-determined immobilized solid tracer is either hydrocarbon soluble, water soluble or both water soluble and hydrocarbon soluble and wherein the composite either comprises:

(i) the tracer adsorbed onto a water-insoluble adsorbent substrate, the water-insoluble adsorbent having a surface area between from about 1 $m^2/g$ to about 100 $m^2/g$;

(ii) the tracer absorbed into the pores within a porous particulate;

(iii) the tracer adsorbed onto a calcined porous metal oxide substrate, the surface area of the calcined porous metal oxide substrate being between from about 1 $m^2/g$ to about 10 $m^2/g$ and the diameter of the calcined porous metal oxide substrate being between from about 0.1 to about 3 mm; or (iv) a microemulsion comprising the tracer and an emulsified solvent-surfactant blend wherein the particle size of the tracer in the microemulsion is between from about 0.001 microns to about 100 microns and further wherein the solid tracer is capable of being slowly solubilized into fluids produced from the well;

(b) traversing the slurry into a screen or liner within the well and retaining the gravel pack sand particulates and composite by the screen or liner within the well; and (c) slowly releasing the solid tracer from the composite and solubilizing the solid tracer in water, hydrocarbons or both water and hydrocarbons over a period of at least six months and monitoring the solubilized immobilized tracer in fluids removed from the well.

13. The method of claim 12, wherein the composite comprises either:

(i) the tracer adsorbed onto a water-insoluble adsorbent, wherein the water-insoluble adsorbent having a surface area between from about 1 $m^2/g$ to about 100 $m^2/g$ and further wherein the amount of tracer in the composite is from about 0.05 to about 5 weight percent based on the total weight of the composite;

(ii) the tracer absorbed into the pores of a porous particulate wherein the particle size of the porous particulate is between from about 0.3 mm to about 5 mm; or (iii) the tracer adsorbed onto a calcined porous metal oxide substrate; the surface area of the calcined porous metal oxide substrate being between from about 1 $m^2/g$ to about 10 $m^2/g$ and the diameter of the calcined porous metal oxide substrate being between from about 0.1 to about 3 mm.

14. The method of claim 13, wherein the tracer is absorbed into the pores of a porous particulate.

15. The method of claim 13, wherein the solid tracer is adsorbed onto a water-insoluble adsorbent.

16. The method of claim 12, wherein the solid tracer is within a shaped compressed pellet comprising the composite and a binder.

17. The method of claim 12, wherein the slurry traverses the slurry into the screen or liner after positioning of a crossover service tool within the well.

* * * * *